(12) United States Patent
Slawinska et al.

(10) Patent No.: US 10,830,135 B2
(45) Date of Patent: Nov. 10, 2020

(54) INLET FRAME FOR A GAS TURBINE ENGINE

(71) Applicant: GENERAL ELECTRIC COMPANY, Schenectady, NY (US)

(72) Inventors: Estera Slawinska, Mazowieckie (PL); Krzysztof Korzepski, Mazowieckie (PL); Artur Kolodziejczyk, Mazowieckie (PL); John Alan Manteiga, North Andover, MA (US)

(73) Assignees: GENERAL ELECTRIC COMPANY POLSKA SP. Z O.O, Warsaw (PL); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/028,617

(22) Filed: Jul. 6, 2018

(65) Prior Publication Data
US 2019/0048797 A1 Feb. 14, 2019

(30) Foreign Application Priority Data

Aug. 14, 2017 (EP) ..................................... 17461586
Oct. 12, 2017 (EP) ..................................... 17196075

(51) Int. Cl.
*F02C 7/04* (2006.01)
*F04D 29/70* (2006.01)
(Continued)

(52) U.S. Cl.
CPC ................ *F02C 7/04* (2013.01); *B33Y 80/00* (2014.12); *F01D 9/045* (2013.01); *F01D 25/002* (2013.01);
(Continued)

(58) Field of Classification Search
CPC . F01D 9/04; F01D 25/002; F02C 7/04; F33Y 80/00
See application file for complete search history.

(56) References Cited

U.S. PATENT DOCUMENTS 2,663,993 A 12/1953 Mosser
4,214,851 A 7/1980 Tuley et al.
(Continued)

FOREIGN PATENT DOCUMENTS

DE 2458273 A1 6/1976
EP 1908928 A2 4/2008
(Continued)

OTHER PUBLICATIONS

English Translation of Girardot et al. (WO 2014177790).*
(Continued)

*Primary Examiner* — Ninh H. Nguyen
*Assistant Examiner* — Aye S Htay
(74) *Attorney, Agent, or Firm* — Hanley, Flight & Zimmerman, LLC

(57) ABSTRACT

An inlet frame and a method of additively manufacturing the same are provided. The inlet frame includes a forward annular body spaced apart from a rear annular body to define an inlet passageway in fluid communication with a compressor inlet. The inlet frame may define integral wash manifolds and discharge ports for directing a flow of wash fluid directly through the compressor inlet. In addition, inlet frame may define one or more integral annular heating plenums in fluid communication with a hot air source for heating regions of the inlet frame that are prone to icing conditions.

18 Claims, 10 Drawing Sheets

(51) Int. Cl.
  *F04D 29/063* (2006.01)
  *F01D 9/04* (2006.01)
  *B33Y 80/00* (2015.01)
  *F01D 25/00* (2006.01)
(52) U.S. Cl.
  CPC ......... *F04D 29/063* (2013.01); *F04D 29/705* (2013.01); *F05D 2220/32* (2013.01); *F05D 2230/22* (2013.01); *F05D 2230/31* (2013.01); *F05D 2230/50* (2013.01); *F05D 2230/53* (2013.01); *F05D 2240/14* (2013.01); *F05D 2260/607* (2013.01)

(56) References Cited

U.S. PATENT DOCUMENTS

| | | | | |
|---|---|---|---|---|
| 5,273,395 A * | 12/1993 | McDermott | ............ | B08B 3/02 134/199 |
| 2005/0129506 A1 * | 6/2005 | Aschenbruck | ............ | F01D 3/00 415/104 |
| 2007/0028947 A1 * | 2/2007 | Erickson | ............ | F01D 25/002 134/22.18 |
| 2007/0289471 A1 | 2/2007 | Erickson et al. | | |
| 2008/0078422 A1 | 4/2008 | Wagner | | |
| 2008/0307769 A1 | 12/2008 | Chaney et al. | | |
| 2013/0318975 A1 | 12/2013 | Stoia et al. | | |
| 2015/0330305 A1 | 11/2015 | Tall, Jr. et al. | | |
| 2016/0023272 A1 * | 1/2016 | Mongillo, Jr. | ............ | B22F 5/009 416/95 |
| 2016/0069209 A1 | 3/2016 | Girardot et al. | | |
| 2016/0193695 A1 | 7/2016 | Haynes | | |
| 2016/0368050 A1 | 12/2016 | Morris et al. | | |
| 2017/0268424 A1 | 9/2017 | Grissino et al. | | |
| 2019/0048798 A1 | 2/2019 | Slawinska et al. | | |

FOREIGN PATENT DOCUMENTS

| | | |
|---|---|---|
| EP | 1908928 A3 | 9/2010 |
| EP | 2857657 A1 | 4/2015 |
| EP | 2944772 A1 | 11/2015 |
| EP | 3153256 A1 | 4/2017 |
| EP | 3219958 A1 | 9/2017 |
| GB | 761435 | 11/1956 |
| JP | S54145811 A | 11/1979 |
| JP | H09310625 A | 12/1997 |
| JP | 2000095195 A | 4/2000 |
| JP | 2000/274206 A | 10/2000 |
| JP | 2001317302 A | 11/2001 |
| JP | 2007/040307 A | 2/2007 |
| JP | 2015/533650 A | 11/2015 |
| JP | 2016/521329 A | 7/2016 |
| RU | 2169851 C2 | 6/2001 |
| WO | WO2014/177790 A1 | 11/2014 |
| WO | WO2016/096438 | 6/2016 |
| WO | WO2018/013642 A1 | 1/2018 |

OTHER PUBLICATIONS

European Search Report Application No. 17196075 dated Mar. 27, 2018.
European Search Report Application No. 17461587 dated Jun. 6, 2018.
Canadian Intellectual Property Office, "Notice of Allowance," dated Feb. 24, 2020 in connection with Canadian Patent Application No. 3,013,139, 1 page.
Japanese Patent Office, "Notice of Allowance," dated Apr. 14, 2020 in connection with Japanese Patent Application No. 2018-149253, 1 page.
Japanese Patent Office, "Office Action," dated Apr. 7, 2020 in connection with Japanese Patent Application No. 2018-149254, 2 pages.
United States Patent and Trademark Office, "Restriction Requirement," dated Mar. 4, 2020 in connection with U.S. Appl. No. 16/028,589, 6 pages.
State Intellectual Property Office of China, "Office Action," dated Jun. 28, 2020 in connection with Chinese Patent Application No. 2018109216334, 10 pages.
European Patent Office, "Extended European Search Report," dated May 12, 2020 in connection with European Patent Application No. 20169012.0, 10 pages.
United States Patent and Trademark Office, "Non-Final Office Action," dated Sep. 4, 2020 in connection with U.S. Appl. No. 16/028,589, 13 pages.

* cited by examiner

INLET FRAME FOR A GAS TURBINE ENGINE

FIELD

The present subject matter relates generally to gas turbine engines, and more particularly, to additively manufactured inlet frames of gas turbine engines.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Certain gas turbine engines include inlet frames configured to receive and direct airflow to the compressor section. These inlet frames may define an inlet to the core engine and may include one or more inlet guide vanes (IGV) which may be used, for example, to modify the airflow directed into the compressor to prevent downstream compressor rotor blades from stalling or surging. In addition, a plurality of fluid distribution systems and manifolds may be installed onto the inlet frames for performing various functions. For example, inlet frames may include a water wash manifold positioned at the inlet for performing a compressor washing operation. In addition, anti-icing manifolds may provide heated air to areas of the inlet frame that are prone to icing conditions, such as the inlet screen and the IGVs.

However, these fluid distribution systems and manifolds often require multiple parts resulting in more complicated assembly, increased costs, and decreased reliability. For example, conventional inlet frames include a large number of fluid manifolds, supply conduits, support structures, spray nozzles, and other parts. Each of these parts must be individually positioned, oriented, and connected to the supporting structure and the inlet frame, e.g., via brazing, welding, or another joining method. The manufacturing time and costs associated with the assembly of such an inlet frame are very high and the likelihood of fluid leaks between the manifolds and conduits is increased due to the number of joints formed. In addition, manufacturing restrictions limit the number, size, configuration, and position of fluid distribution systems and manifolds that may be included in the inlet frame.

Accordingly, a gas turbine engine with an improved inlet frame would be useful. More specifically, an inlet frame including fluid distribution systems and manifolds that improve performance and simplify manufacturing and assembly would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an inlet frame for a gas turbine engine is provided. The gas turbine engine defines an axial direction, a radial direction, and a circumferential direction and includes a compressor defining a compressor inlet and being rotatable about the axial direction for pressurizing an airflow. The inlet frame includes a forward annular body and a rear annular body spaced apart from the forward annular body to define an inlet passageway in fluid communication with the compressor inlet. The inlet frame also includes an annular wash manifold defining an annular wash plenum and an inlet conduit defining a wash fluid passageway in fluid communication with the annular wash plenum. A plurality of discharge ports are defined by the rear annular body, the plurality of discharge ports providing fluid communication between the annular wash plenum and the inlet passageway.

In another exemplary aspect of the present disclosure, a method for manufacturing an inlet frame of a gas turbine engine is provided. The method includes depositing a layer of additive material on a bed of an additive manufacturing machine and selectively directing energy from an energy source onto the layer of additive material to fuse a portion of the additive material and form the inlet frame. The inlet frame includes a forward annular body and a rear annular body spaced apart from the forward annular body to define an inlet passageway. The inlet frame further includes an annular wash manifold defining an annular wash plenum and an inlet conduit defining a wash fluid passageway in fluid communication with the annular wash plenum. A plurality of discharge ports are defined by the rear annular body, the plurality of discharge ports providing fluid communication between the annular wash plenum and the inlet passageway.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
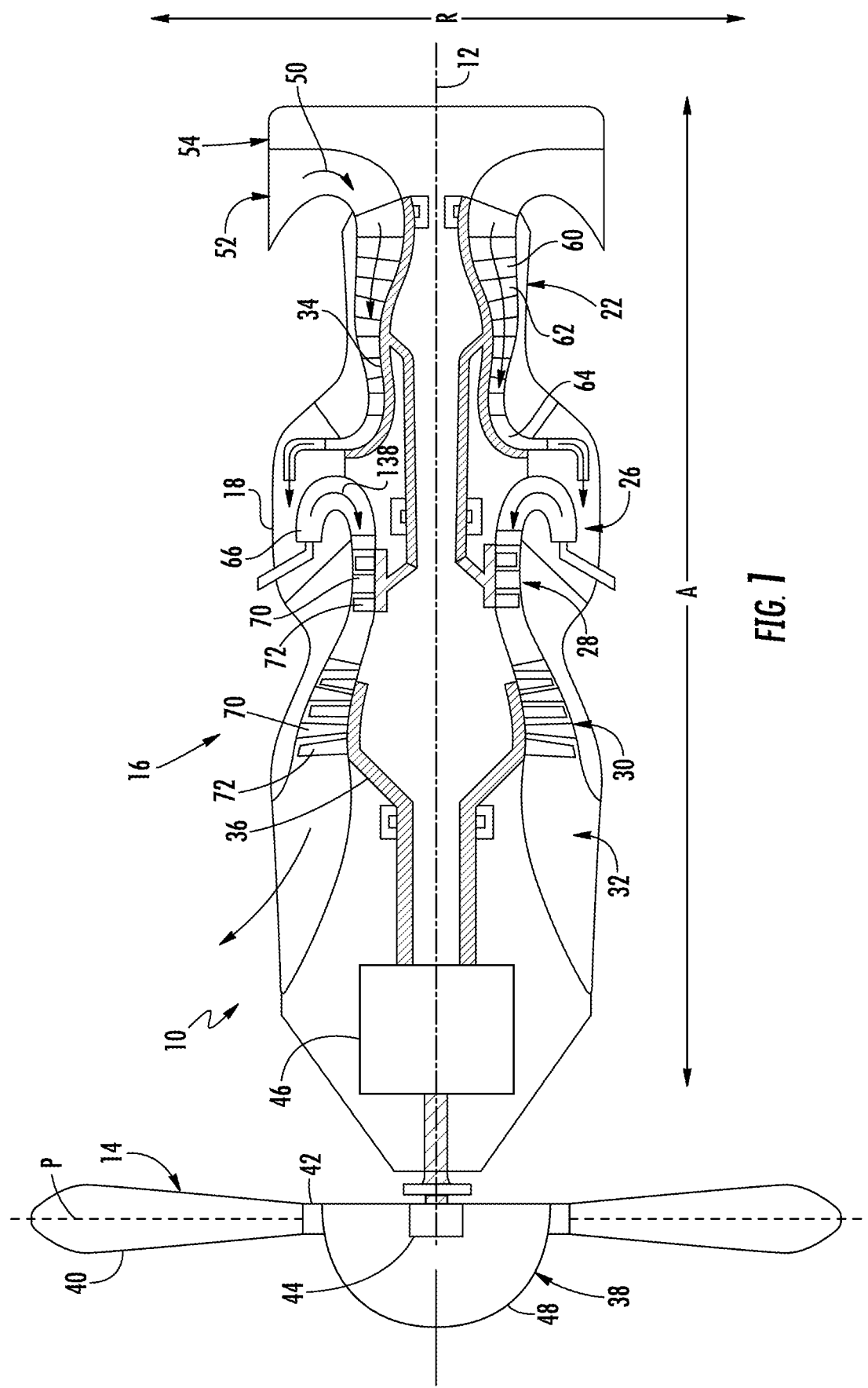
FIG. 1 is a schematic cross-sectional view of an exemplary turboprop engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to an inlet frame and a method of additively manufacturing the same. The inlet frame includes a forward annular body spaced apart from a rear annular body to define an inlet passageway in fluid communication with a compressor inlet. The inlet frame may define integral wash manifolds and discharge ports for directing a flow of wash fluid directly through the compressor inlet. In addition, inlet frame may define one or more integral annular heating plenums in fluid communication with a hot air source for heating regions of the inlet frame that are prone to icing conditions.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed downstream from the propeller section 14, the propeller section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, an HP turbine 28, an LP turbine 30, and an exhaust section 32. An air flow path generally extends through compressor 22, combustion section 26, HP turbine 28, LP turbine 30, and exhaust section 32 which are in fluid communication with each other.

A high pressure (HP) shaft or spool 34 drivingly connects the HP turbine 28 to the compressor 22. A low pressure (LP) shaft or spool 36 drivingly connects the LP turbine 30 to propeller section 14 of the turboprop engine 10. For the embodiment depicted, propeller section 14 includes a variable pitch fan 38 having a plurality of propeller blades 40 coupled to a disk 42 in a spaced apart manner. As depicted, the propeller blades 40 extend outwardly from disk 42 generally along the radial direction R. Each propeller blade 40 is rotatable relative to the disk 42 about a pitch axis P by virtue of the propeller blades 40 being operatively coupled to a suitable actuation member 44 configured to collectively vary the pitch of the propeller blades 40 in unison. The propeller blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front hub 48 aerodynamically contoured to promote an airflow through the plurality of propeller blades 40.

During operation of the turboprop engine 10, a volume of air 50 passes through blades 40 of fan 38 and is urged toward a radial inlet 52 of core turbine engine 16. More specifically, turboprop engine 10 includes an inlet frame 54 that defines radial inlet 52 that routes an inlet portion of the flow of air 50 from inlet 52 downstream to compressor 22. Compressor 22 includes one or more sequential stages of compressor stator vanes 60, one or more sequential stages of compressor rotor blades 62, and an impeller 64. The one or more sequential stages of compressor stator vanes 60 are coupled to the outer casing 18 and compressor rotor blades 62 are coupled to HP shaft 34 to progressively compress the flow of air 50. Impeller 64 further compresses air 50 and directs the compressed air 50 into combustion section 26 where air 50 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of propeller section 14 through LP shaft 36. Combustion gases 68 exit turboprop engine 10 through exhaust section 32.

It should be appreciated that the exemplary turboprop engine 10 depicted in FIG. 1 is by way of example only and that in other exemplary embodiments, turboprop engine 10 may have any other suitable configuration. For example, it should be appreciated that in other exemplary embodiments, turboprop engine 10 may instead be configured as any other suitable turbine engine, such as a turbofan engine, turbojet engine, internal combustion engine, etc. Furthermore, although turboprop engine 10 described above is an aeronautical gas turbine engine for use in a fixed-wing or rotor aircraft, in other exemplary embodiments, turboprop engine 10 may be configured as any suitable type of gas turbine engine that used in any number of applications, such as a land-based, industrial gas turbine engine, or an aeroderivative gas turbine engine.

In addition, in other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized to drive a propeller of a helicopter, may be utilized in aeroderivative applications, or may be attached to a propeller for an airplane. Additionally, in other exemplary embodiments, turboprop engine 10 may include any other suitable type of combustor, and may not include the exemplary reverse flow combustor depicted.

Referring still to FIG. 1, turboprop engine 10 may include inlet frame 54 for routing a flow of air into core turbine engine 16. Although the description below refers to the construction of inlet frame 54, it should be appreciated that inlet frame 54 is used only for the purpose of explaining aspects of the present subject matter. Indeed, aspects of the present subject matter may be applied to form inlet frames used in automotive, aviation, maritime, and other industries to assist in directing a flow of air into an engine to support operation.

In general, the exemplary embodiments of inlet frame 54 described herein may be manufactured or formed using any suitable process. However, in accordance with several aspects of the present subject matter, inlet frame 54 may be formed using an additive-manufacturing process, such as a 3-D printing process. The use of such a process may allow inlet frame 54 to be formed integrally, as a single monolithic component, or as any suitable number of sub-components. In particular, the manufacturing process may allow inlet frame 54 to be integrally formed and include a variety of features not possible when using prior manufacturing methods. For example, the additive manufacturing methods described herein enable the manufacture of inlet frames having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Figure 2:
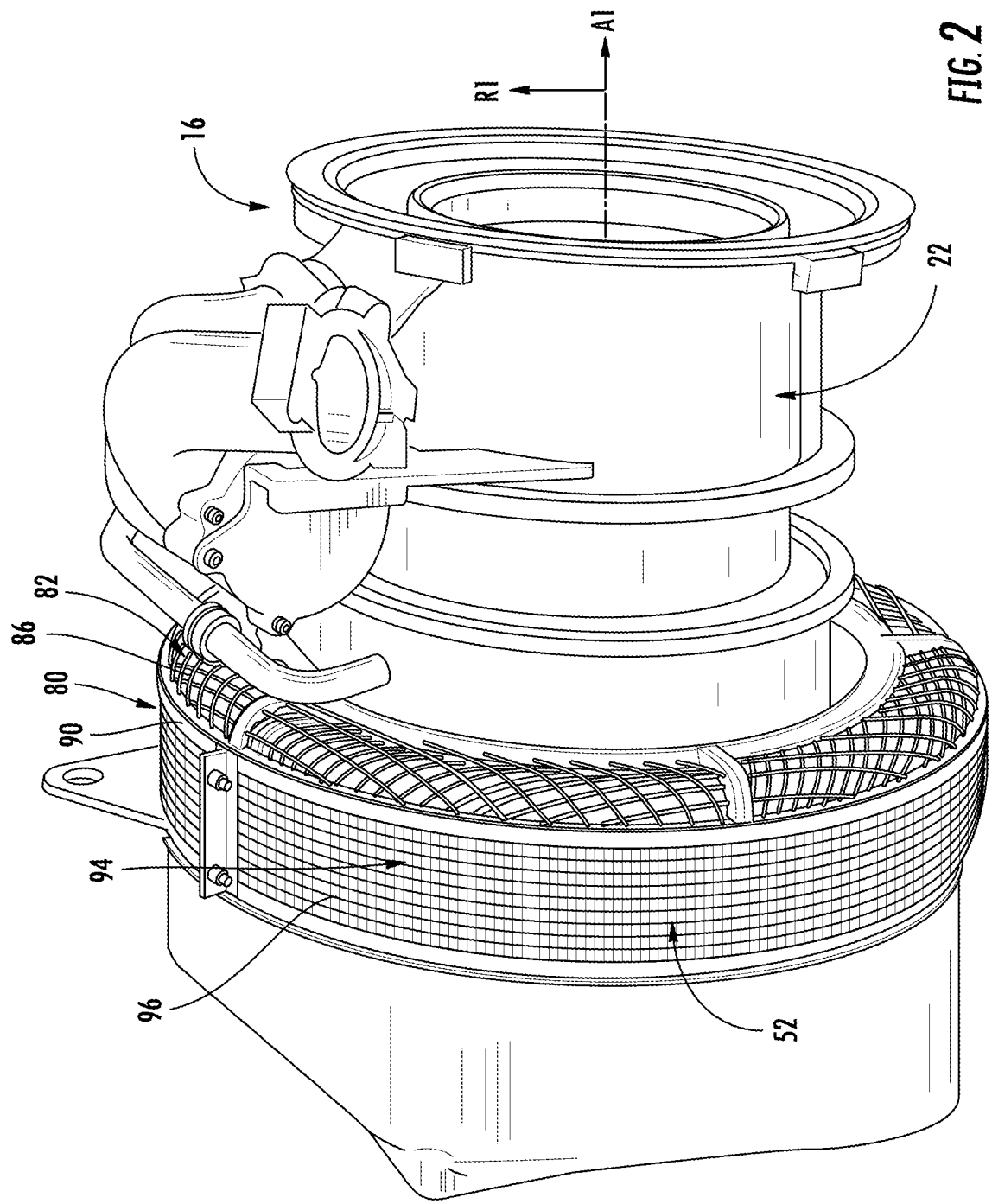
FIG. 2 provides a perspective view of an inlet frame and an inlet screen installed on a high pressure compressor of a turboprop engine according to an exemplary embodiment of the present subject matter with various details removed for clarity.
Figure 3:
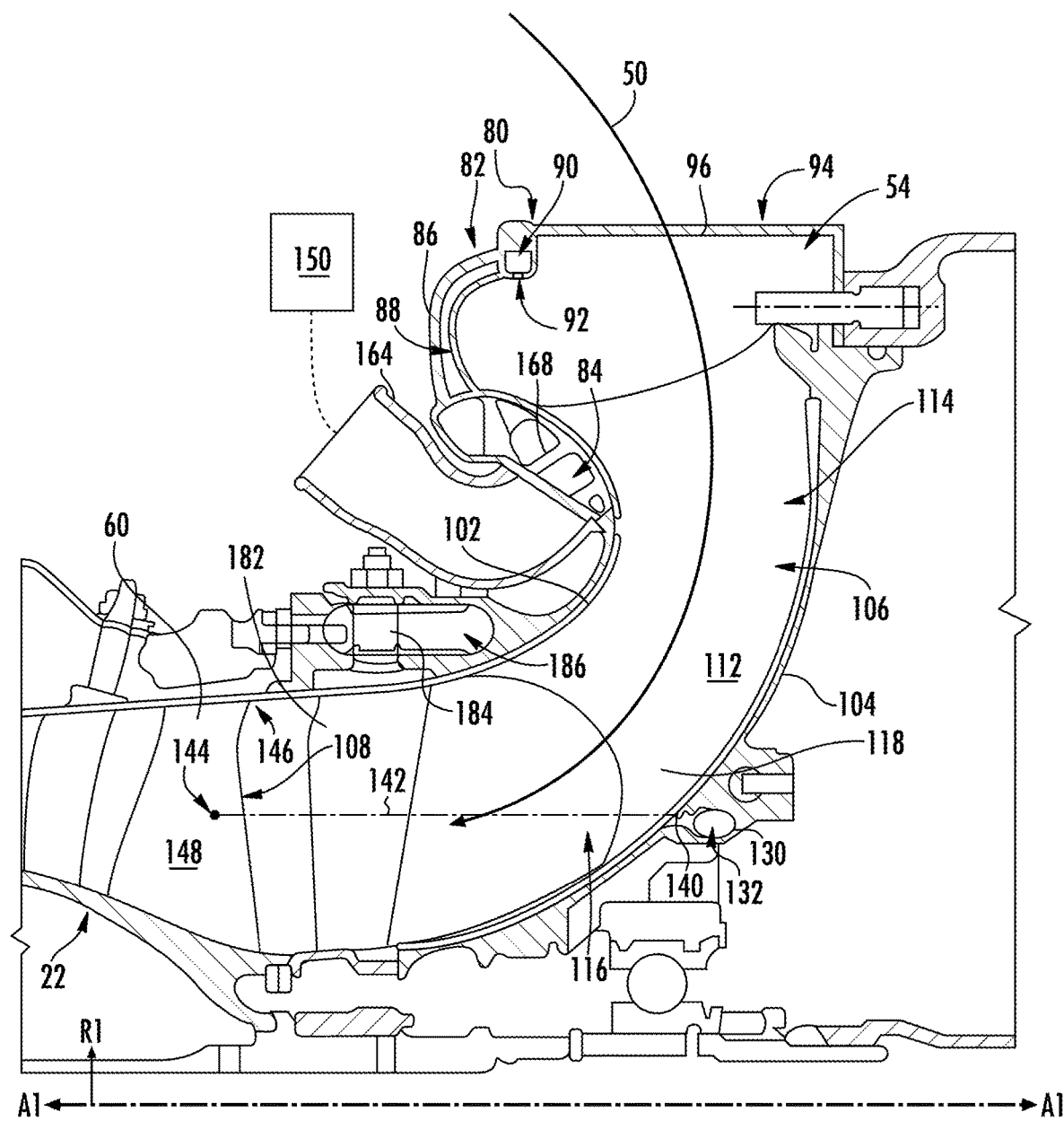
FIG. 3 is a schematic cross-sectional view of the exemplary inlet frame of FIG. 2 according to an exemplary embodiment of the present subject matter.

Referring now generally to FIGS. 2 through 8, inlet frame 54 is described according to exemplary embodiments of the present subject matter. As best shown in FIGS. 2 and 3, inlet frame 54 defines an axial direction A1, a radial direction R1, and a circumferential direction C1 which correspond to the similar directions of turboprop engine 10 when inlet frame 54 is installed. It should be appreciated that inlet frame 54 is described herein only as an exemplary embodiment used for explaining aspects of the present subject matter. For clarity, not all portions of inlet frame 54 are illustrated in the figures, and modifications and variations may be made to inlet frame 54 while remaining within the scope of the present subject matter.

Referring now specifically to FIG. 2, a perspective view of inlet frame 54 as used in a gas turbine engine will be described according to an exemplary embodiment of the present subject matter. Although inlet frame 54 is described herein as being used in turboprop engine 10, it should be appreciated that inlet frame 54 may be used in other gas turbine engines and may include various modifications and variations while remaining within the scope of the present subject matter.

As illustrated in FIG. 2 and described briefly above, inlet frame 54 is positioned upstream of compressor 22 and defines radial inlet 52 for receiving inlet air into core engine 16. More specifically, inlet frame 54 is generally configured for routing an inlet portion of the flow of air 50 from inlet 52 downstream to compressor 22. As shown, inlet frame 54 includes an inlet screen 80 positioned over radial inlet 52 for preventing undesirable debris from entering compressor 22 and core engine 16.

Referring now also to FIG. 3, inlet screen 80 will be described according to an exemplary embodiment. As illustrated, inlet screen 80 includes a forward inlet screen 82 that extends from an inlet heating plenum 84 (described in more detail below) outward along the radial direction R. Forward inlet screen 82 includes a plurality of interwoven tubes 86 defining holes through which inlet air 50 may pass while filtering out unwanted debris. According to the exemplary embodiment, each tube 86 defines a fluid passageway 88 in fluid communication with inlet heating plenum 84 for receiving a flow of heated fluid. Although inlet screen 82 is illustrated herein as being an integral portion of inlet frame 54, it should be appreciated that inlet screen 82 may be a separate component joined with inlet frame 54 in any suitable manner.

Although tubes 86 are illustrated herein as being interwoven, it should be appreciated that any other suitable shape, size, and configuration of tubes 86 may be used according to alternative embodiments. For example, tubes 86 may extend parallel to each other along the radial direction R to define flow passageways therebetween for the flow of air 50 to pass through. In addition, the shape of inlet screen 80 may vary according to alternative embodiments. For example, forward inlet screen 82 is illustrated as being curved, such that it extends from inlet heating plenum 84 substantially along the radial direction R before being routed toward the rear annular body 104, e.g., along the axial direction A. Other shapes and configurations are possible and within the scope of the present subject matter.

Inlet screen 80 further includes an annular discharge manifold 90 defining one or more discharge ports 92 in fluid communication with inlet passageway 106 (described in more detail below) for discharging the heating air back into the flow of air 50. Each of the plurality of interwoven tubes 86 terminates in annular discharge manifold 90. In this manner, one continuous passageway is defined for receiving a flow of heated fluid, e.g., air bled off of compressor 22, for heating inlet screen 80 to prevent the formation of ice which can clog inlet 52 or cause other operability issues. More specifically, a flow of heated air from compressor 22 can pass through inlet heating plenum 84, through tubes 86, and into annular discharge manifold 90 before being discharged into inlet passageway 106 through discharge ports 92. Although annular discharge manifold 90 is described herein as being a single manifold extending 360 degrees around the entire inlet frame 54, it should be appreciated that annular discharge manifold 90 may instead be a plurality of discrete segments that can operate independently of adjacent segments or may be in fluid communication with adjacent segments.

In addition, according to exemplary embodiments of the present subject matter, inlet screen 80 may further include an outer screen 94 that is positioned over radial inlet 52 and extends between annular discharge manifold 90 and rear annular body 104 (described in more detail below) substantially along the axial direction A. According to the illustrated embodiment, outer screen 94 includes a plurality of interwoven wires 96 that are in thermal communication with annular discharge manifold 90. More specifically, wires 96 extend from annular discharge manifold 90 such that heat is conducted through wires 96 to further prevent icing on outer screen 94. It should be appreciated that wires 96 may or may not be integrally formed with annular discharge manifold 90 according to various embodiments.

Referring now to FIG. 3, a close-up schematic view of the exemplary inlet frame 54 of turboprop engine 10 is provided. As illustrated, inlet frame 54 includes a forward annular body 102 and a rear annular body 104. Rear annular body 104 is spaced apart from forward annular body 102 along the axial direction A1 and the radial direction R1 to define an inlet passageway 106. Inlet passageway 106 generally provides fluid communication between radial inlet 52 of core turbine engine 16 and a compressor inlet 108 of compressor 22 of turboprop engine 10. It should be appreciated that as used herein, "forward" and "rear" are used generally to define the relative positioning of components along the axial direction A1 of inlet frame 54.

As illustrated, inlet passageway 106 is a radial inlet configured to receive and direct an airflow (indicated by arrow 50) along a flow path 112 to compressor inlet 108. Inlet passageway 106 generally includes two sections: a radial section 114 and a transition section 116. Radial section 114 is oriented generally along radial direction R1. In this manner, the radial inlet 52 of inlet passageway 106 is considered a radial inlet. Transition section 116 is positioned downstream of radial section 114 and has a generally arcuate or curved shape. Transition section 116 defines a segment of inlet passageway 106 that transitions the flow path 112 from a generally radial direction R1 to a generally axial direction A1. Therefore, airflow 50 enters inlet passageway 106 substantially along the radial direction R1 and is transitioned or redirected to enter compressor inlet 108 substantially along the axial direction A. In this regard, it should be appreciated that turboprop engine 10 is illustrated herein as a "reverse flow" engine, although other configurations are possible according to alternative embodiments.

Figure 4:
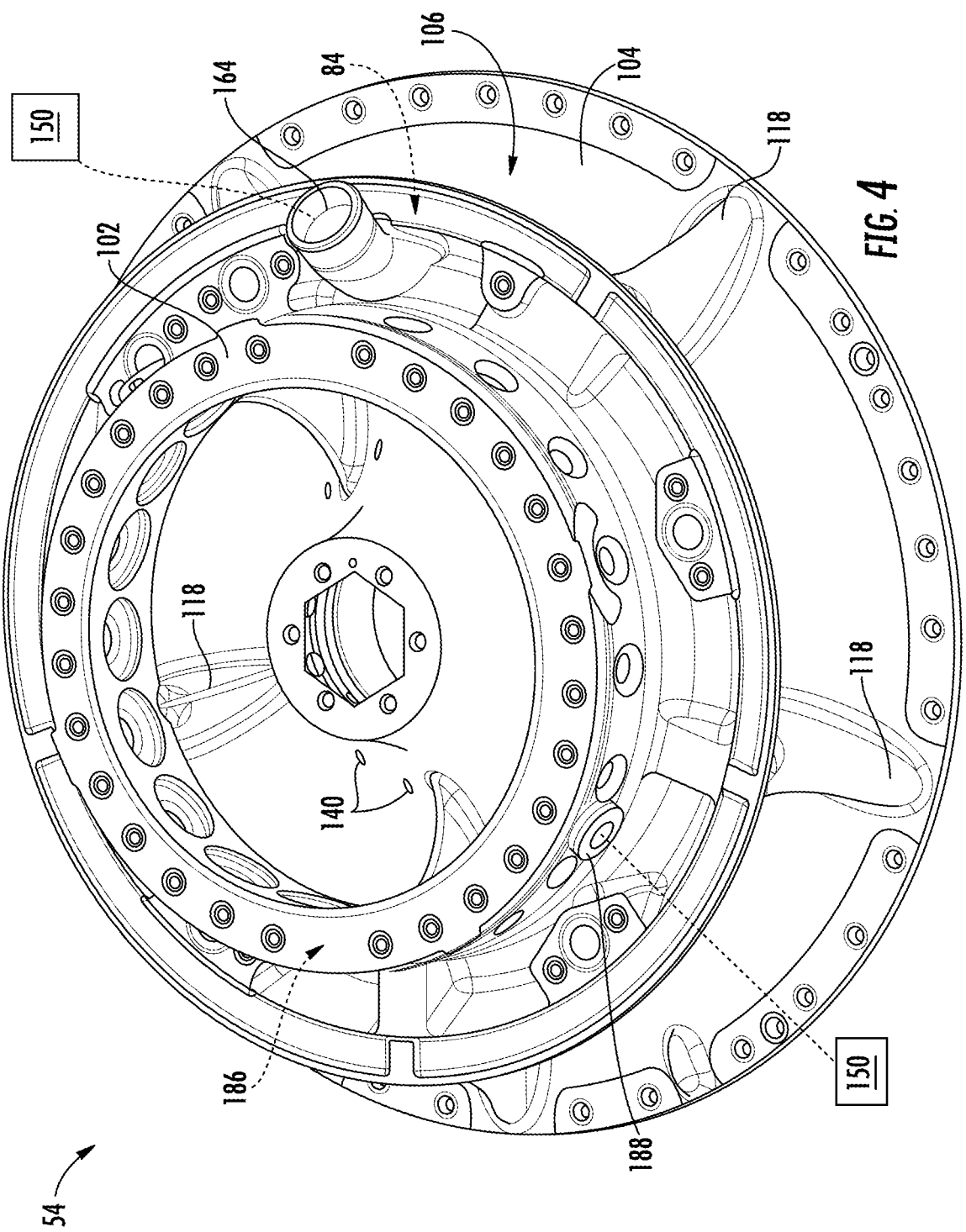
FIG. 4 provides a perspective view of an additively manufactured inlet frame, such as the exemplary inlet frame of FIG. 2 according to an exemplary embodiment of the present subject matter.

In addition, referring generally to FIGS. 2 through 4, inlet frame 54 includes a plurality of support struts 118 positioned within inlet passageway 106 and extending between forward annular body 102 and rear annular body 104. Support struts 118 are generally positioned equidistantly about the circumferential direction C1 to provide structural support to inlet frame 54. In addition, support struts 118 may be aerodynamically contoured to reduce stagnation of airflow 50 and improve the transition of airflow 50 between the radial section 114 and the transition section 116 of inlet passageway 106. According to the illustrated embodiment, inlet frame 54 includes five support struts extending along greater than half of the length of flow path 112 of inlet passageway 106. However, according to alternative embodiments, inlet frame 54 may include any suitable number, size, position, and configuration of support struts 118.

Referring now also to FIGS. 5 through 8, inlet frame 54 may include a plurality of fluid distribution and/or air supply conduits and plenums for serving various functions. In general, using the additive manufacturing techniques described herein, some or all of these various fluid circulation features may be integrally formed within inlet frame 54 during a single additive manufacturing process. In addition to reducing the number of necessary components, assembly time, costs, and reliability concerns (e.g., related to leaks), integrally forming such features using additive manufacturing may provide significant performance advantages, some of which will be described below.

Figure 5:
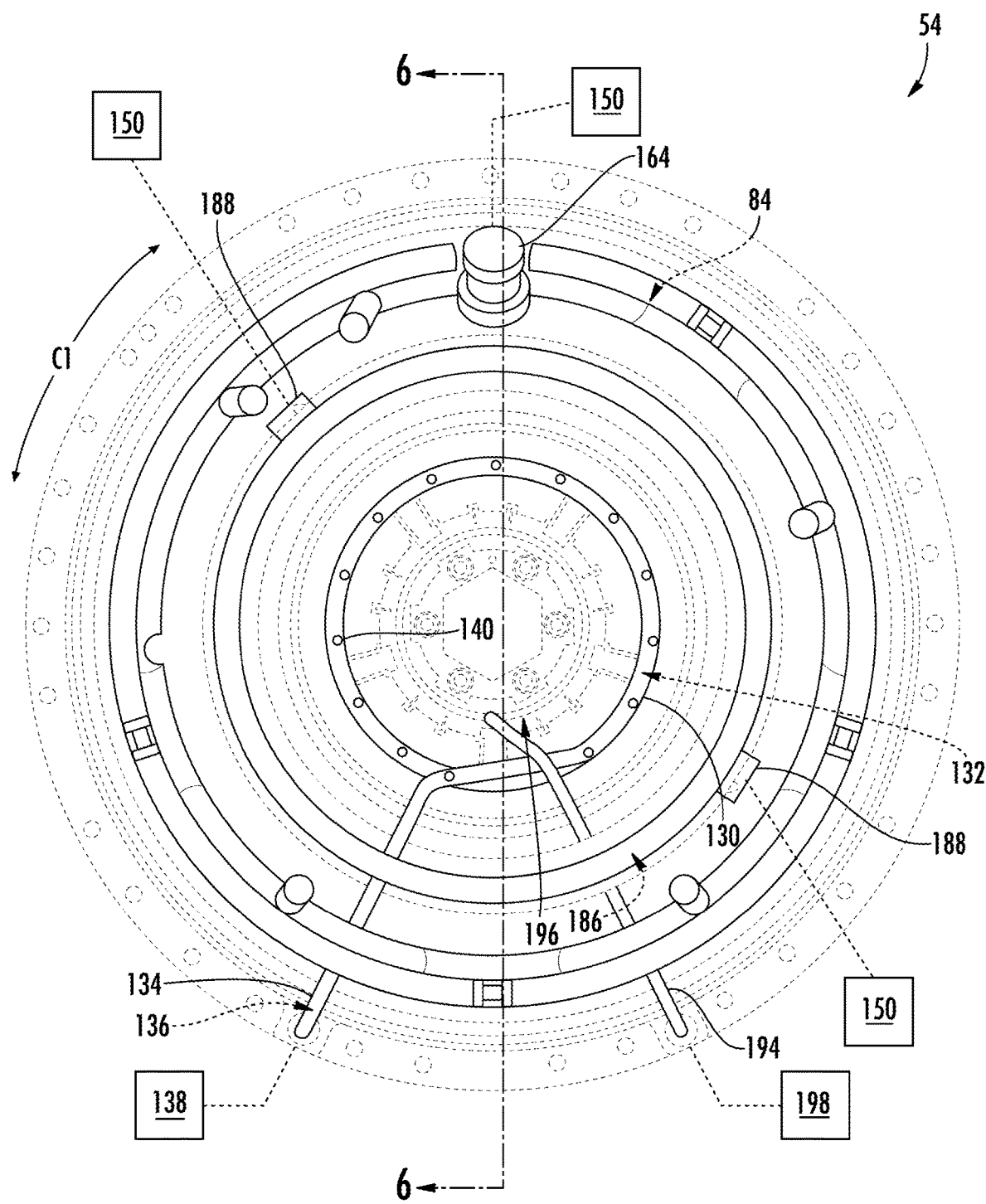
FIG. 5 provides a front view of the exemplary inlet frame of FIG. 4 with portions of the inlet frame shown in phantom to reveal various integral fluid distribution systems according to an exemplary embodiment of the present subject matter.
Figure 6:
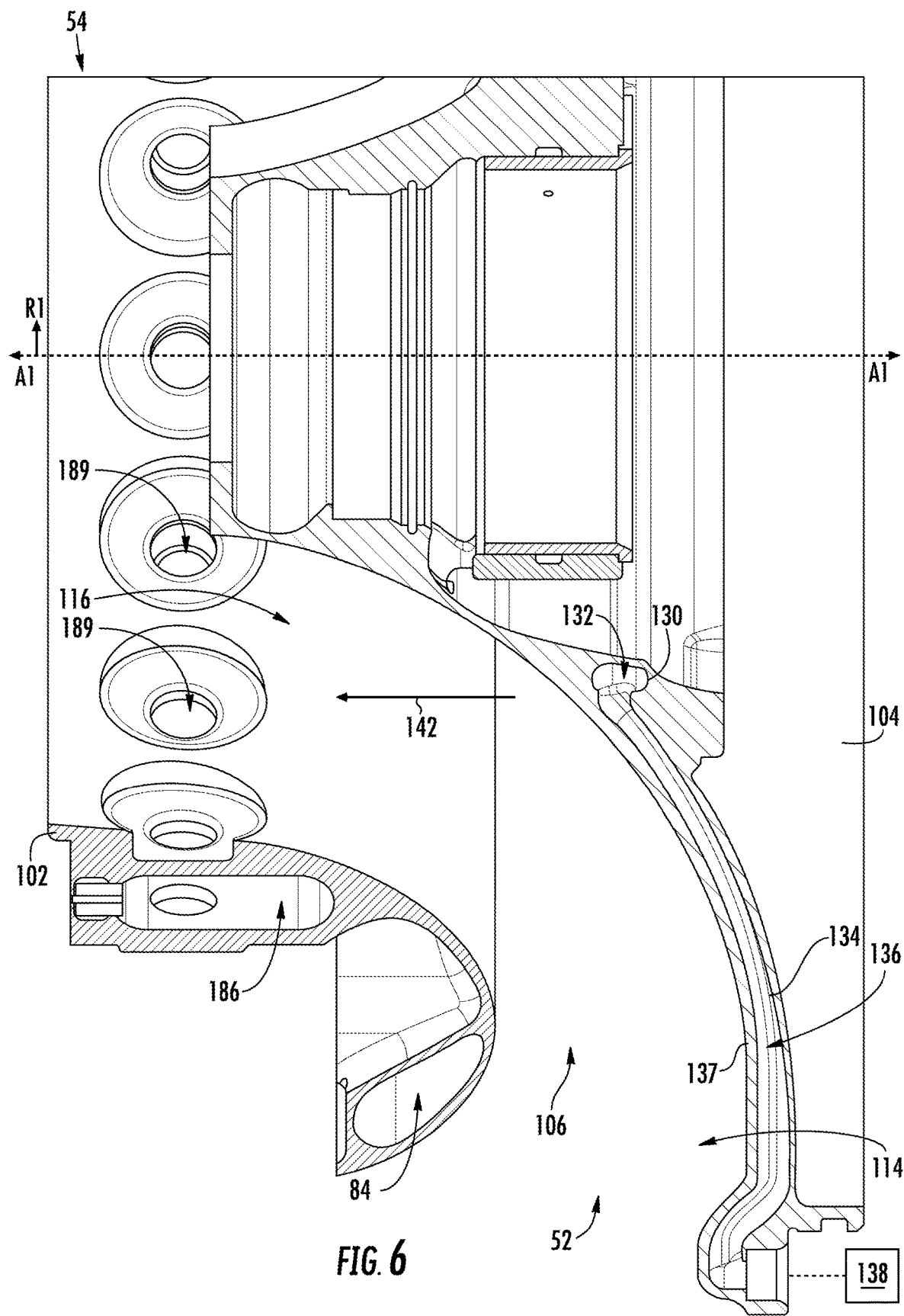
FIG. 6 provides a cross-sectional view of the exemplary inlet frame of FIG. 4, taken along Line 6-6 of FIG. 5.
Figure 7:
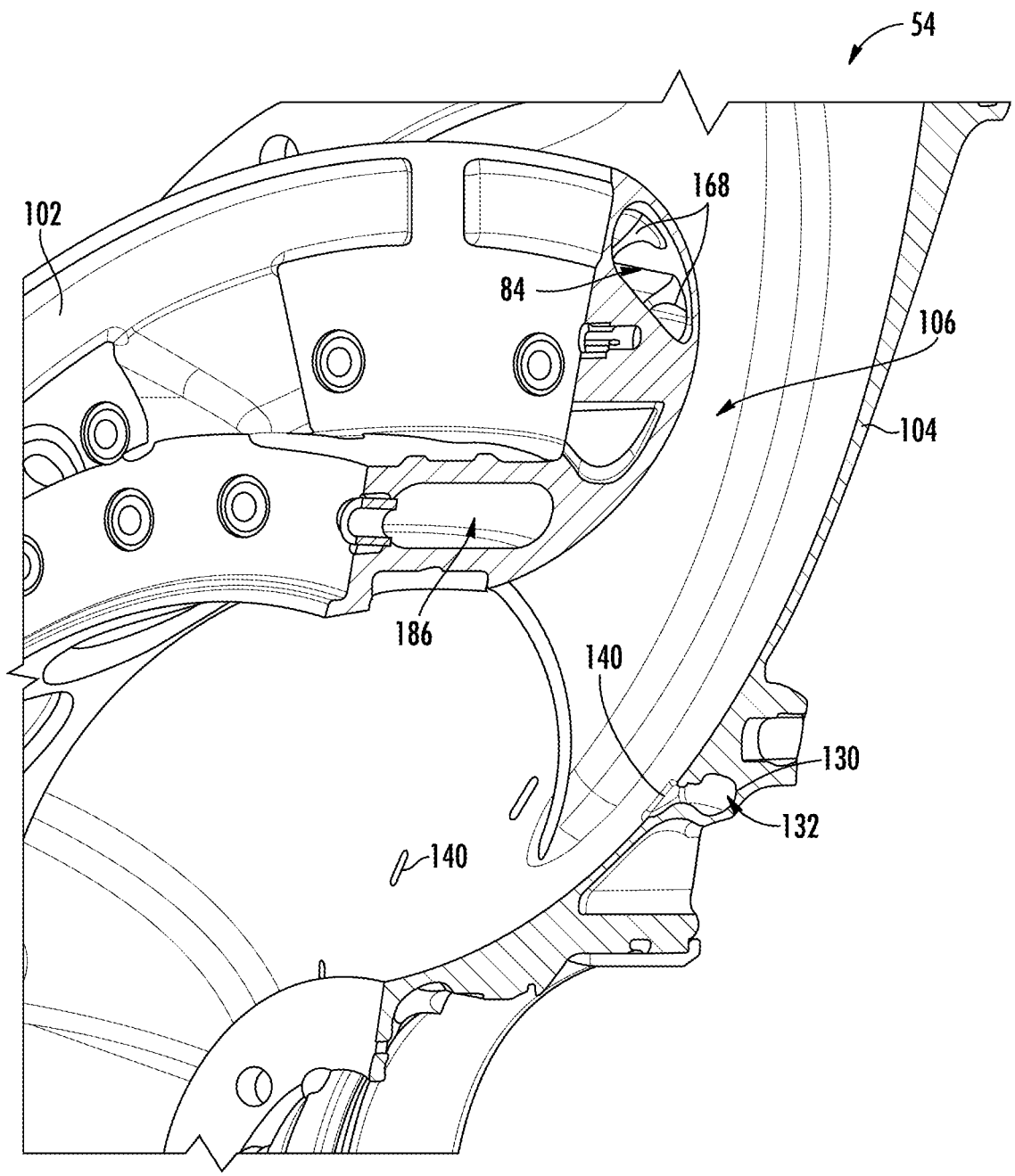
FIG. 7 provides another perspective cross-sectional view of the exemplary inlet frame of FIG. 4.

As best illustrated in FIGS. 5 through 7, inlet frame 54 may include an annular wash manifold 130 defining an annular wash plenum 132. Inlet frame 54 further includes an inlet conduit 134 defining a wash fluid passageway 136 in fluid communication with annular wash plenum 132. As best illustrated in FIG. 6, inlet conduit 134 is positioned proximate and/or within a front wall 137 of rear annular body 104 and extends along the radial direction R1 between annular wash manifold 130 and radial inlet 52 of turboprop engine 10. Front wall 137 and other walls defined throughout inlet frame 54 may be manufactured at any suitable thickness. For example, according to exemplary embodiments, front wall 137 is less than ten millimeters thick and front wall 137 of the illustrated embodiment is about two millimeters thick.

Inlet conduit 134 may be fluidly coupled to a wash fluid supply 138. In this manner, a flow of wash fluid may be supplied from wash fluid supply 138, through wash fluid passageway 136, and into annular wash plenum 132. Annular wash manifold 130 extends along the circumferential direction C1 to distribute the flow of wash fluid around annular wash plenum 132. Although a single inlet conduit 134 is illustrated (e.g., in FIG. 6), it should be appreciated that more than one inlet conduit may be used according to alternative embodiments, e.g., spaced apart along the circumferential direction C1. Furthermore, according to one exemplary embodiment, forward annular body 102, rear annular body 104, annular wash manifold 130, and inlet conduit 134 are integrally formed as a single monolithic component.

As best illustrated in FIG. 7, inlet frame 54 further comprises a plurality of discharge ports 140. More specifically, discharge ports 140 are defined by and integrally formed within rear annular body 104, e.g., using the additive manufacturing techniques described herein. In general, discharge ports 140 provide fluid communication between annular wash plenum 132 and inlet passageway 106. In this manner, when a flow of wash fluid is supplied from wash fluid supply 138 into annular wash manifold 130, the wash fluid is ejected from discharge ports 140 and into compressor 22 of turboprop engine 10 to perform a washing operation. Discharge ports 140 may have any suitable size, geometry, and orientation in order to achieve the desired spray volume, cone size, and trajectory. For example, according to the illustrated embodiment, discharge ports 140 are elongated along the radial direction R1, e.g., such that a spray cone height covers the entire height of compressor inlet 108.

Notably, due to manufacturing constraints, conventional wash fluid manifolds were positioned outside the inlet frame, e.g., at a location radially outside the inlet of the inlet frame. Such a configuration may lead to inefficient cleaning because the flow of wash fluid would rely on the turning engine to redirect that flow from the radial direction toward the axial direction for direct contact with the rotor blades and stator vanes of the compressor. In this regard, indirect spray of wash fluid frequently decreases the effectiveness of the cleaning operation.

In order to improve the cleaning efficiency of the wash system, discharge ports 140 of inlet frame 54 are positioned in line of sight with compressor inlet 108. As used herein, "line of sight" is used to refer to the relative positioning of two components or features that are in direct and unobstructed view of each other. According to another embodiment, a fluid spray line 142 extends between each of the plurality of discharge ports 140 and a midpoint 144 of compressor inlet 108 along the radial direction R1. According to one embodiment, fluid spray line 142 is substantially parallel to the axial direction A1. In this manner, the flow of wash fluid may be ejected from discharge ports 140 directly through compressor inlet 108 and into compressor 22, e.g., such that it may directly strike and clean stator vanes 60 and rotor blades 62. According to another embodiment, discharge ports 140 are positioned radially inward of an intersection 146 between forward annular body 102 and a forward edge of a first compressor airfoil 148.

According to the illustrated embodiment, inlet frame 54 includes fourteen discharge ports 140 equidistantly spaced about rear annular body 104 along the circumferential direction C1. Notably, using the additive manufacturing techniques described here, discharge ports 140 may be formed at any suitable position and have any suitable size, shape, or orientation as needed for performing a specific cleaning operation. For example, discharge ports 140 may be formed at any suitable position(s), oriented in any suitable angle(s), and may be staggered or radially offset along the circumferential direction C1 and/or the radial direction R1. By integrating annular wash manifold 130 and inlet conduit 134, and by defining discharge ports 140 in rear annular body 104, the cleaning efficiency and reliability of the wash system are improved while the overall weight of inlet frame 54 is decreased and maintenance issues and costs are reduced.

Referring now generally to FIGS. 2 through 8, inlet frame 54 may further include various anti-icing features positioned within or proximate regions of inlet frame 54 that are subjected to cold air and have a tendency to form ice during operation of turboprop engine 10. In general terms, inlet frame 54 may include one or more annular heating plenums, e.g., which are defined by forward annular body 102. In addition, inlet frame 54 can include a fluid supply conduit defining a hot fluid passageway in fluid communication with the annular heating plenums. These annular heating plenums and fluid supply conduits (examples of which will be provided below) are generally configured for providing a flow is hot air to heat regions of inlet frame 54 to reduce the likelihood if ice build-up or to melt existing ice. For example, the annular heating plenums may be in fluid communication with a hot air source 150 for providing a flow of heated fluid to the annular heating plenum. According to the illustrated embodiment, hot air source 150 is compressor 22 of turboprop engine 10 and the flow of heated fluid is hot, compressed air bled off of compressor 22.

For example, according to one embodiment, inlet frame 54 defines an inlet screen 80 (e.g., as described above and illustrated in FIGS. 2 and 3) configured as a filtering device positioned over inlet 52. Inlet screen 80 is prone to forming ice due to the very cold temperatures it experiences during operation of turboprop engine 10. Therefore, the annular heating plenum may be an inlet heating plenum 84 (also described above). Inlet heating plenum 84 is an annular plenum defined at a radially outer portion of the forward annular body 102 proximate inlet screen 80 of turboprop engine 10. In addition, the fluid supply conduit may be an inlet heating conduit 164 that defines the hot fluid passageway in fluid communication with inlet heating plenum 84.

Inlet screen 80 may be heated simply through conductive heating, e.g., via contact with inlet frame 54 proximate inlet heating plenum 84. Alternatively, inlet screen 80 may define one or more fluid passageways 88 (e.g., such as described above) in fluid communication with inlet heating plenum 84 for receiving heated air from inlet heating conduit 164. In this manner, for example, a flow of hot, compressed air may be bled off of hot air source 150 (e.g., compressor 22) and passed through inlet heating conduit 164 to inlet heating plenum 84 where it is distributed to various fluid passageways 88 for heating inlet screen 80.

As best illustrated in FIGS. 3 and 7, forward annular body 102 may further define a plurality of stiffening ribs 168 within inlet heating plenum 84. Stiffening ribs 168 may be positioned at desired locations circumferentially within inlet heating plenum 84 for providing necessary structural support to inlet frame 54. In addition, according to exemplary embodiments, stiffening ribs 168 may be configured for splitting and/or redirecting the flow of heated air to improve the heating of inlet screen 80.

Figure 8:
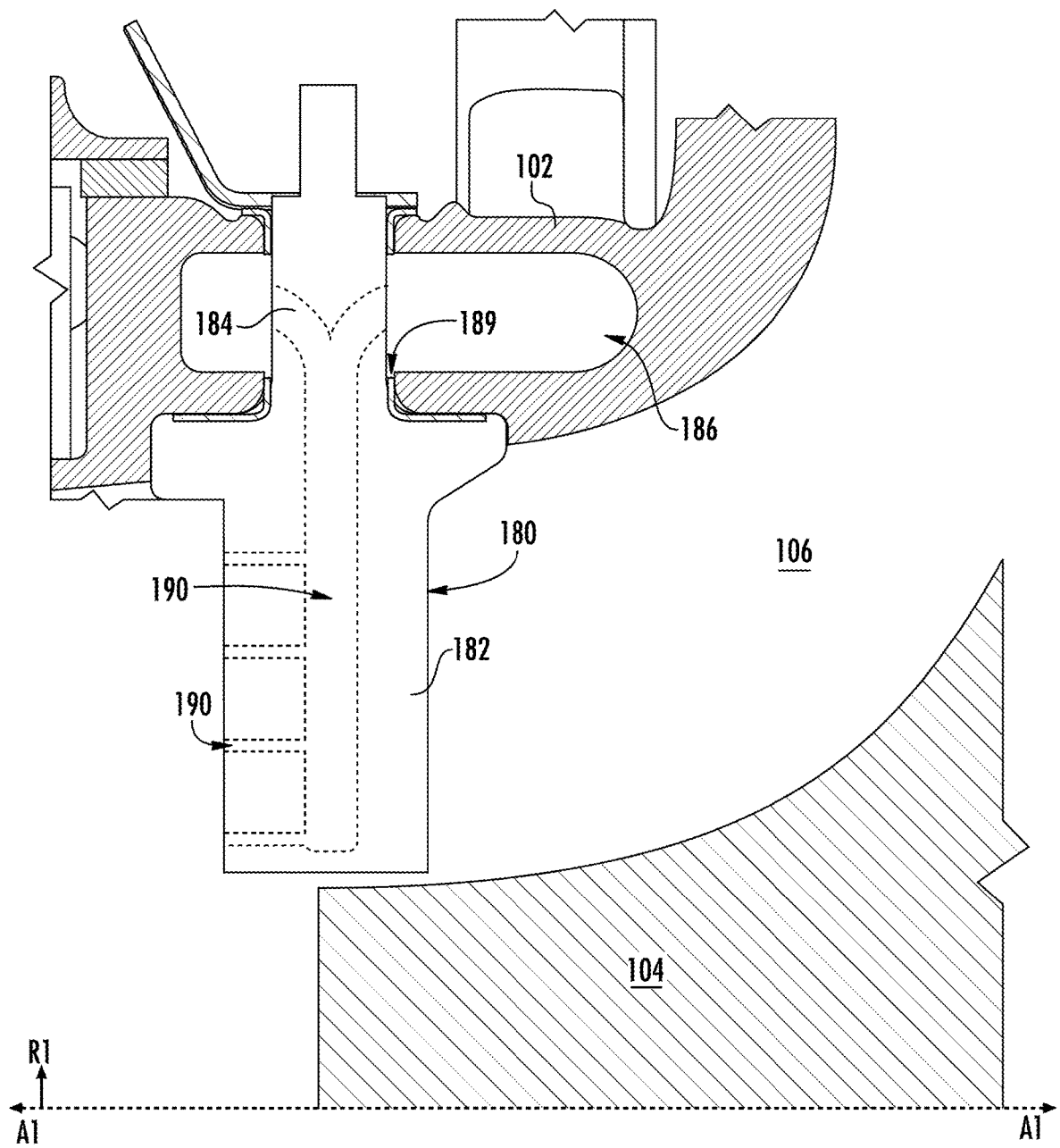
FIG. 8 provides a cross-sectional view of a vane heating plenum and an inlet guide vane according to an exemplary embodiment of the present subject matter.

Referring to FIG. 8, inlet frame 54 may further include a plurality of inlet guide vanes 180 disposed circumferentially about inlet passageway 106. Inlet guide vanes 180 may be fixed or variable guide vanes having a vane 182 positioned within inlet passageway 106 and a spindle 184 coupled to forward annular body 102. Inlet guide vane 180 is configured for modifying and guiding airflow 50 to maximize engine performance and to provide safe engine operating conditions, among other benefits. In particular, inlet guide vane 180 is configured to modify airflow 50 to deliver a defined preswirl to compressor 22 in accordance with compressor's 22 operating condition or point. This, for example, may ensure that an adequate compressor stall/surge margin over a wide operating range is achieved.

Similar to inlet screen 80, inlet guide vanes 180 are prone to forming ice during operation of turboprop engine 10. Therefore, the annular heating plenum may be a vane heating plenum 186 defined on a forward end (e.g., proximate compressor inlet 108) of forward annular body 102. In addition, the fluid supply conduit may be a vane heating conduit 188 that defines the hot fluid passageway in fluid communication with vane heating plenum 186. Notably, spindle 184 of each inlet guide vane 180 extends into vane heating plenum 186 for heating. More specifically, for example, forward annular body 102 may define a plurality of apertures 189 spaced circumferentially about forward annular body 102 and being in fluid communication with vane heating plenum 186. Each spindle 184 may extend through one of the apertures 189 and into vane heating plenum 186 for heating. As best illustrated in FIG. 6, a bushing may be positioned within each aperture 189 to protect spindle 184 and annular body 102. Bushings may be made from different metals to withstand intensive wear and can be easily replaced if needed.

Inlet guide vanes 180 may be heated simply through conductive heating, e.g., via contact with hot air within vane heating plenum 186. Alternatively, inlet guide vanes 180 may define one or more fluid passageways 190 in fluid communication with vane heating plenum 186 for receiving heated air from vane heating conduit 188. In this manner, for example, a flow of hot, compressed air may be bled off of hot air source 150 (e.g., compressor 22) and passed through vane heating conduit 188 to vane heating plenum 186 where it is distributed to various fluid passageways 190 for heating inlet guide vanes 180.

Referring now to FIG. 5, inlet frame 54 may further include an oil drain conduit 194 defined by rear annular body 104. Oil drain conduit 194 is in fluid communication with an oil collection region 196 of inlet frame 54. For example, according to one exemplary embodiment, oil drain conduit 194 is positioned at the six o'clock position along the circumferential direction C1 within an A-sump of turboprop engine 10. In this manner, collected oil will fall under the force of gravity through oil drain conduit 194 to an oil reservoir 198 (FIG. 5) for recycling or disposal. Other positions and configurations of oil drain conduit 194 are possible and within the scope of the present subject matter.

It should be appreciated that inlet frame 54 is described herein only for the purpose of explaining aspects of the present subject matter. For example, inlet frame 54 will be used herein to describe exemplary configurations, constructions, and methods of manufacturing inlet frame 54. It should be appreciated that the additive manufacturing techniques discussed herein may be used to manufacture other inlet frames and components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of inlet frame 54 according to an exemplary embodiment of the present subject matter has been presented, an exemplary method 200 for forming an inlet frame according to an exemplary embodiment of the present subject matter is provided. Method 200 can be used by a manufacturer to form inlet frame 54, or any other suitable inlet frame. It should be appreciated that the exemplary method 200 is discussed herein only to describe exemplary aspects of the present subject matter, and is not intended to be limiting.

Figure 9:
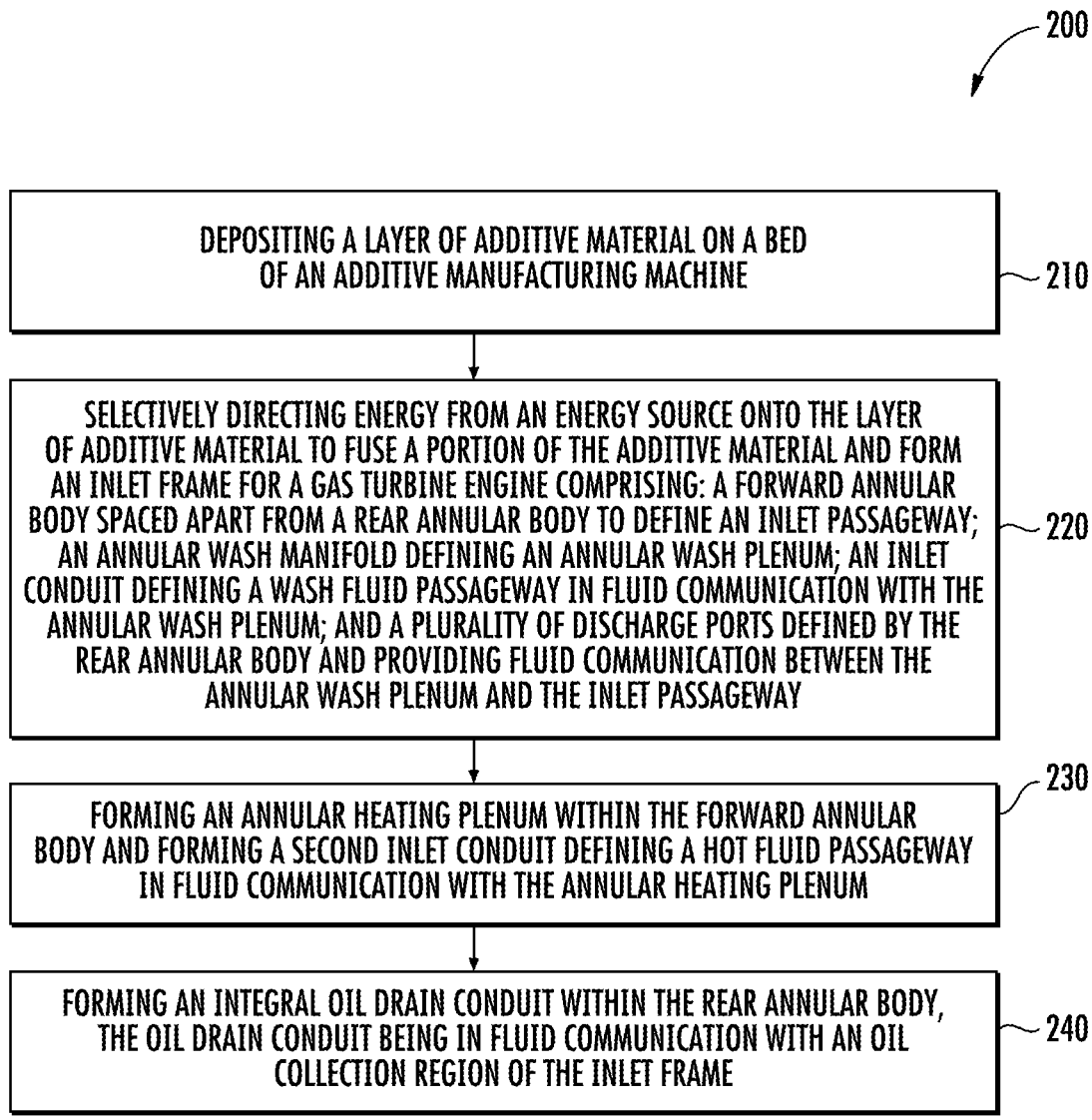
FIG. 9 is a method of manufacturing an inlet frame according to an exemplary embodiment of the present subject matter.

Referring now to FIG. 9, method 200 includes, at step 210, depositing a layer of additive material on a bed of an additive manufacturing machine. Method 200 further includes, at step 220, selectively directing energy from an energy source onto the layer of additive material to fuse a portion of the additive material and form an inlet frame of a gas turbine engine.

For example, using the example from above, the inlet frame formed at step 220 may include a forward annular body spaced apart from a rear annular body to define an inlet passageway; an annular wash manifold defining an annular wash plenum; an inlet conduit defining a wash fluid passageway in fluid communication with the annular wash plenum; and a plurality of discharge ports defined by the rear annular body and providing fluid communication between the annular wash plenum and the inlet passageway. Notably, according to an exemplary embodiment, the forward annular body, the rear annular body, the annular wash manifold, and the inlet conduit are integrally formed as a single monolithic component.

Method 200 may further include, at step 230, forming an annular heating plenum within the forward annular body. In addition, a fluid supply conduit may be formed defining a hot fluid passageway in fluid communication with the annular heating plenum. According to one embodiment, the hot fluid passageway provides fluid communication between the annular heating plenum and a hot air source, such as a source of compressor bleed air, for providing a flow of heated fluid to the annular heating plenum.

Method 200 may further include, at step 240, forming an integral oil drain conduit within the rear annular body. According to an exemplary embodiment, the oil drain conduit is in fluid communication with an oil collection region of the inlet frame. It should be appreciated that other fluid distribution manifolds, conduits, and passageways may be included according to alternative embodiments.

Figure 10:
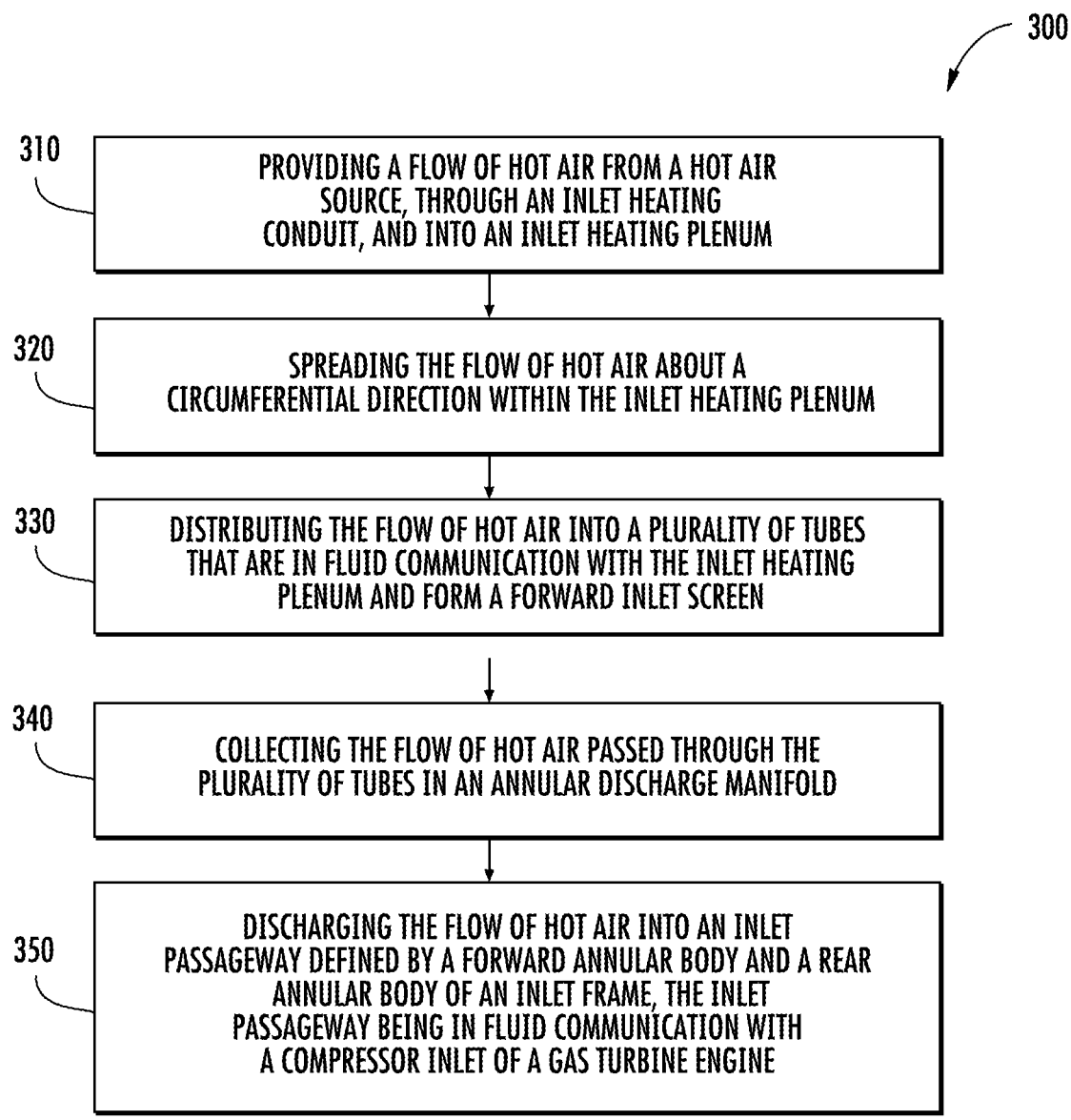
FIG. 10 is a method of heating an inlet screen of an inlet frame of a turboprop engine according to an exemplary embodiment of the present subject matter.

Referring now to FIG. 10, an exemplary method 300 for heating an inlet screen of an inlet frame of a gas turbine engine is described. Continuing the example from above, the inlet frame may be inlet frame 54 and the gas turbine engine may be turboprop engine 10, such that turboprop engine 10 defines an axial direction, a radial direction, and a circumferential direction. However, it should be appreciated that the exemplary method 300 is discussed herein only to describe exemplary aspects of the present subject matter, and is not intended to be limiting.

Referring now to FIG. 10, method 300 includes, at step 310, providing a flow of hot air from a hot air source, through an inlet heating conduit, and into an inlet heating plenum. Step 320 includes spreading the flow of hot air about the circumferential direction within the inlet heating plenum and step 330 includes distributing the flow of hot air into a plurality of tubes that are in fluid communication with the inlet heating plenum and form a forward inlet screen. At step 340, method 300 includes collecting the flow of hot air passed through the plurality of tubes in an annular discharge manifold. Method 300 further includes, at step 350, discharging the flow of hot air into an inlet passageway defined by a forward annular body and a rear annular body of the inlet frame, the inlet passageway being in fluid communication with a compressor inlet of the gas turbine engine.

FIGS. 9 and 10 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of methods 200 and 300 are explained using inlet frame 54 as an example, it should be appreciated that these methods may be applied to manufacture any suitable inlet frame or component.

An additively manufactured inlet frame and a method for manufacturing that inlet frame are described above. Notably, inlet frame 54 may generally include performance-enhancing geometries, cleaning features, and anti-icing features whose practical implementations are facilitated by an additive manufacturing process, as described below. For example, using the additive manufacturing methods described herein, the inlet frame may include an improved compressor wash system, anti-icing plenums for the inlet screen and/or inlet guide vanes, and integral oil drain conduits. These features may be introduced during the design of the inlet frame, such that they may be easily integrated into the inlet frame during the build process at little or no additional cost. Moreover, the entire inlet frame, including the forward annular body, the rear annular body, the support struts, the wash manifold, the heating manifold, the various inlet conduits, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An inlet frame for a gas turbine engine, the gas turbine engine defining an axial direction, a radial direction, and a circumferential direction, the gas turbine engine comprising a compressor defining a compressor inlet and being rotatable about the axial direction for pressurizing an airflow, the inlet frame comprising:
   a forward annular body;
   a rear annular body spaced apart from the forward annular body to define an inlet passageway in fluid communication with the compressor inlet;
   an annular wash manifold defining an annular wash plenum;
   an inlet conduit defining a wash fluid passageway in fluid communication with the annular wash plenum; and
   a plurality of discharge ports defined by the rear annular body, the plurality of discharge ports providing fluid communication between the annular wash plenum and the inlet passageway, wherein the forward annular body, the rear annular body, the annular wash manifold, and the inlet conduit are integrally formed as a single monolithic component, and wherein the inlet conduit is integrated within the rear annular body and extends along the radial direction between the annular wash manifold and a radial inlet of the gas turbine engine.

2. The inlet frame of claim 1, wherein the plurality of discharge ports are positioned radially inward of an intersection between the forward annular body and a forward edge of a first compressor airfoil.

3. The inlet frame of claim 1, wherein a fluid spray line extends between each of the plurality of discharge ports and a midpoint of the compressor inlet along the radial direction, the fluid spray line being substantially parallel to the axial direction.

4. The inlet frame of claim 1, wherein the plurality of discharge ports comprises at least three discharge ports.

5. The inlet frame of claim 1, wherein the inlet conduit is positioned proximate a front wall of the rear annular body.

6. The inlet frame of claim 5, wherein the front wall of the rear annular body is less than two millimeters thick.

7. The inlet frame of claim 1, wherein the inlet conduit is one of a plurality of inlet conduits positioned circumferentially around the rear annular body.

8. The inlet frame of claim 1, wherein each of the plurality of discharge ports is elongated along the radial direction.

9. The inlet frame of claim 1, further comprising:
   an oil drain conduit defined by the rear annular body, the oil drain conduit being in fluid communication with an oil collection region of the inlet frame.

10. The inlet frame of claim 1, wherein the inlet passageway comprises:
    a radial section oriented generally along the radial direction; and
    a transition section positioned downstream of the radial section and configured to direct the airflow generally along the axial direction.

11. The inlet frame of claim 1, further comprising:
    a plurality of support struts positioned within the inlet passageway and extending between the forward annular body and the rear annular body.

12. The inlet frame of claim 1, wherein the inlet frame comprises a plurality of layers formed by:
    depositing a layer of additive material on a bed of an additive manufacturing machine; and
    selectively directing energy from an energy source onto the layer of additive material to fuse a portion of the additive material.

13. A method for manufacturing an inlet frame of a gas turbine engine, the gas turbine engine defining an axial direction, a radial direction, and a circumferential direction, the method comprising:
    depositing a layer of additive material on a bed of an additive manufacturing machine; and
    selectively directing energy from an energy source onto the layer of additive material to fuse a portion of the additive material and form the inlet frame comprising:
    a forward annular body;
    a rear annular body spaced apart from the forward annular body to define an inlet passageway;
    an annular wash manifold defining an annular wash plenum;
    an inlet conduit defining a wash fluid passageway in fluid communication with the annular wash plenum; and
    a plurality of discharge ports defined by the rear annular body, the plurality of discharge ports providing fluid communication between the annular wash plenum and the inlet passageway, wherein the forward annular body, the rear annular body, the annular wash manifold, and the inlet conduit are integrally formed as a single monolithic component, wherein the inlet conduit is integrated within the rear annular body and extends along the radial direction between the annular wash manifold and a radial inlet of the gas turbine engine.

14. The method of claim 13, wherein the inlet conduit is positioned proximate a front wall of the rear annular body.

15. The method of claim 14, wherein the inlet conduit is one of a plurality of inlet conduits positioned circumferentially around the front wall of the rear annular body.

16. The method of claim 13, further comprising:
forming an integral oil drain conduit within the rear annular body, the oil drain conduit being in fluid communication with an oil collection region of the inlet frame.

17. The method of claim 13, wherein the plurality of discharge ports are positioned radially inward of an intersection between the forward annular body and a forward edge of a first compressor airfoil.

18. The method of claim 13, wherein a fluid spray line extends between each of the plurality of discharge ports and a midpoint of a compressor inlet along the radial direction, the fluid spray line being substantially parallel to the axial direction.

* * * * *